3,001,228
COATING AND PELLETIZING OF FUSIBLE MATERIALS
Herman Nack, Columbus, Ohio, assignor, by mesne assignments, to G & A Laboratories, Inc., Savannah, Ga., a corporation of Georgia
Filed Jan. 8, 1959, Ser. No. 785,712
8 Claims. (Cl. 18—2.7)

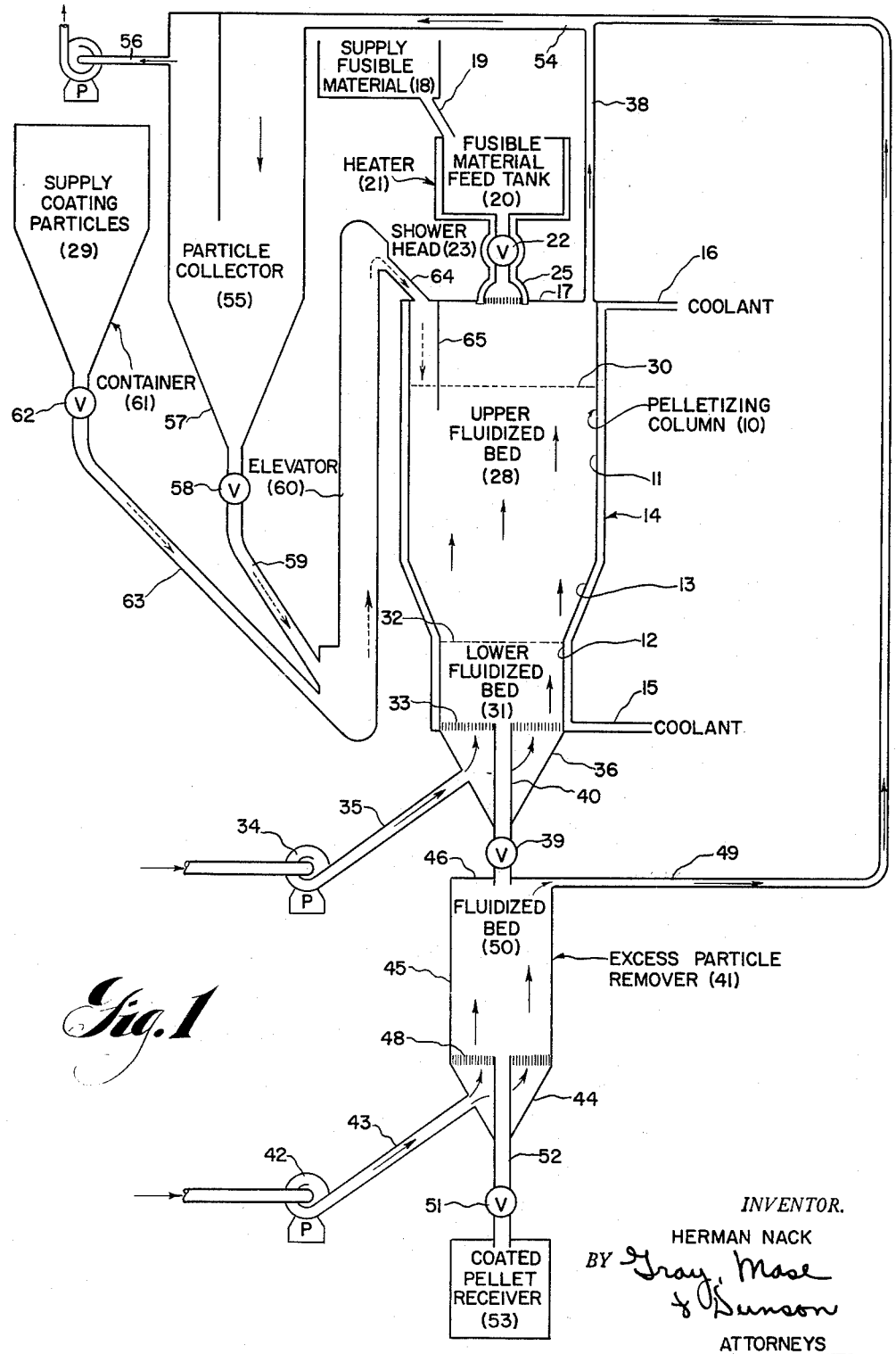

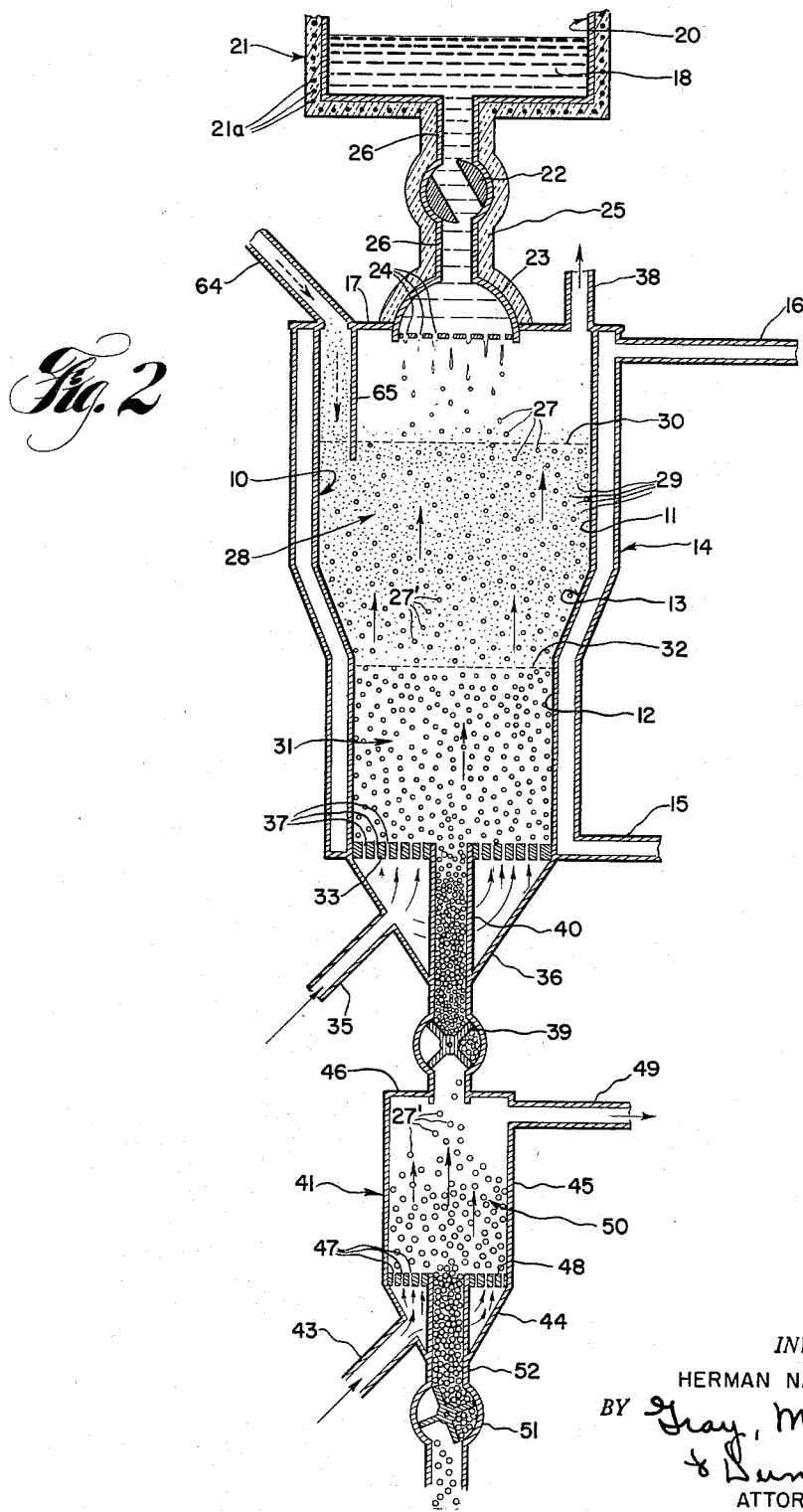

This invention relates to production of coated solid pellets of fusible materials. More particularly, the invention relates to a method of pelletizing and coating fusible materials in a gas-fluidized bed of finely divided coating solids and to an apparatus for practice of the process.

It is known that heretofore fusible materials have been produced in pellet form by several methods. In one method, commonly called prilling, molten droplets of the fusible material are permitted to fall through a tall tower containing air having a temperature lower than that of the entering droplets. The droplets are cooled by the air during their fall so that, upon reaching the bottom of the tower, the droplets have congealed sufficiently to be resistant to breakage and deformation. A variation of prilling is the method of shotting in which a tank of a liquid is positioned at the bottom of the tower to receive the congealed droplets. The liquid serves to cushion the fall of the congealed, or partially congealed, droplets and to provide additional cooling for the droplets. Both of these methods are handicapped by requirement of high cooling towers (sometimes as high as 200 feet) plus the necessity of pumping fusible materials to the top of such towers. Additionally, when coated pellets of fusible materials are desired, it is necessary to provide additional operations, such as tumbling the congealed droplets from these processes with a finely divided coating material in a coating drum, to coat the droplets. Coated pellets from such processes have a coating, which is poorly bonded to the pellet and easily removable upon handling. Loss of coating material from such coated pellets decreases the effectiveness which the coating provided, and creates a troublesome and annoying dust problem.

In another method used heretofore for the manufacture of pellets from fusible materials, molten droplets of the fusible material are caused to contact a cold surface on which the droplets are congealed, or frozen. Pellets from such a process are seldom substantially spherical in shape, and this process requires careful and accurate control of the feed of molten material to avoid excessive deformation of the droplet upon impact with the cold surface. In another method, a molten fusible material is sprayed on a bed of particulate material which may be a fixed bed of material. More frequently, the bed of particulate material is a moving bed in which the particles are substantially fixed in position with respect to each other, but move with respect to the molten fusible material contacting the bed. These processes suffer from the disadvantages of inefficient cooling of the pellets and generally some deformation of the pellets upon impact. These processes may produce pellets having some coating material clinging thereto. However, large amounts of particulate coating material are required because of generally slow cooling rates for the pellets. Additionally, such pellets are not uniformly coated and instead have a heavier coating on the bottom than on the top of the pellet.

It is an object of the present invention to provide a process and apparatus for practice of the process that overcomes the foregoing disadvantages of the prior art methods for preparation of coated pellets of fusible materials. An important object is to provide an improved process for preparation of substantially spherical solid pellets of a fusible material having a uniform, adherent coating of finely divided solids. An additional object is to provide an apparatus for carrying out the improved process. A further object is to provide a superior coated solid pellet of a fusible material. Still other objects and advantages of the invention will be apparent from the following description and examples.

It has been found that difficulties of prior art methods can be avoided and that substantially spherical, solid pellets of fusible materials may be prepared with a uniform adherent coating of finely divided particles of a solid material by the process of this invention. The process employs an apparatus, containing upper and lower fluidized beds which are maintained in a fluidized state by the same current of fluidizing gas. The process uses an upper fluidized bed of the finely divided solids to coat molten droplets of the fusible material and a lower fluidized bed of the coated, solid droplets or pellets, to cool and clean the coated pellets. Fluidization of both the lower and upper beds is maintained by the current of fluidization gas which flows upward through the lower and upper beds. The process requires a velocity of the fluidizing gas high enough to fluidize the coated pellets and a temperature of the gas low enough to cool the coated pellets during the hold-up time in the fluidized bed of pellets to a point where the coated pellets resist deformation upon routine handling.

The gas velocity in the fluidized pellet bed, while high enough to maintain fluidization thereof, should not be so high as to blow, or carry, an appreciable amount of pellets out of the bed of fluidized pellets upwards into the upper fluidized bed. The gas velocity in the upper fluidized bed, while high enough to maintain fluidization thereof, should not be so high as to carry appreciable amounts of solids out of the upper fluidized bed and to eliminate the observable upper free surface or boundary zone of the bed. To achieve the required velocities for fluidization of both the upper and lower beds from the same current of fluidizing gas, there is provided a cross-sectional area of the fluidized bed of pellets that is smaller than the cross-sectional area of the fluidized bed of solids. The apparatus utilized for carrying out the process provides the needed difference in cross-sectional areas of the two fluidization zones and desirably provides a tapered transitional section of the apparatus to join and smoothly blend the lower zone with the upper zone to avoid dead spots in the apparatus during operation. The velocity required for fluidization of the bed of the coated pellets, which are larger in size than the coating solids, is larger than the velocity required to fluidize the bed of coating solids, which are fluidized best at relatively low velocities. It is to be understood that the velocities, which are referred to, are the space velocities of the gas. The space velocities of the gas are the calculated and actual velocities of a gas flowing upward in the fluidization apparatus, when the apparatus is devoid of droplets, solids, and pellets, with no allowance being made for the volume changes of the beds of solids and pellets. Generally, the velocity employed in the fluidized pellet bed provides a gentle fluidization (i.e., a velocity slightly greater than the minimum velocity required to fluidize the pellets). Control of the velocity is important to minimize the hold-up time of the droplets passing through the fluidized particle bed to avoid distortion and agglomeration of partially congealed droplets within this bed.

In the fluidized beds employed by the process of the invention, the upwardly flowing fluidizing gas expands the bed of pellets and the bed of solids so that the packing arrangements of the pellets and also the solids becomes more open. With almost satisfactory fluidizing gas velocities, in the absence of channeling, the pressure drop through the lower bed almost equals the net effective weight of the pellets per unit area of the bed and through the upper bed almost equals the net effective weight of the solids per unit area of the bed. With slightly higher velocities, sufficient and satisfactory velocities are obtained for the process of the invention, since the pellets and solids then are fully supported and the beds are fluidized. Each fluidized bed is a mass of solids, or pellets, in the fluidizing gas and exhibits the liquidlike characteristics of mobility, hydrostatic pressure, and an observable upper free surface or boundary zone across which a marked change in concentration of the solids, or pellets, occurs. In the fluidized beds, the random motion of the pellets and solids increases with an increase in the velocity of the fluidizing gas.

The process of the invention comprises forming molten droplets of the fusible material and introducing the molten droplets into the fluidized solids bed by passage of the molten droplets through the upper free surface of the bed. The bed is maintained at a temperature below the temperature of the introduced molten droplets by control of the temperature of the fluidizing gas and, if desired, by maintenance of the temperature of the fluidized beds by auxiliary cooling means, such as a water-cooled jacket surrounding the portion of the apparatus enclosing the fluidized bed of solids. This temperature should be below the congealing temperature of the fusible material to provide for removal of heat of fusion of the droplets. The temperature has a pronounced effect on the amount of coating agent that adheres to the molten droplet, with the amount increasing with increasing bed temperatures and decreasing with decreasing bed temperatures. As the molten droplets pass through the upper bed, they are simultaneously coated with solids and congealed. The congealed, coated droplets, due to a larger size relative to the solids in the bed, drop out of the fluidized solids bed and enter the lower fluidized bed, which is located below the upper fluidized bed of solids and which contains solidified, coated droplets, or pellets. The lower, or fluidized pellet bed, is maintained in its fluidized state by the upward flowing current of fluidizing gas, which is the same current of gas which subsequently flows upward through the fluidized solids bed to maintain it in its fluidized state. The coated, congealed droplets entering the top of the fluidized pellet bed, while within this bed cool further and lose additional internal heat without distortion of the congealed form. Additionally, coating solids loosely adhering to the pellets are removed by elutriation forces of the fluidizing gas and are carried by the gas upward into the fluidized solids bed to provide cleaned, coated solid pellets. The apparatus provides a means for removal of pellets from the fluidized pellet bed. This means has an opening into the bed of fluidized pellets through which pellets may be removed in a continuous, or a batch, manner. The coated solid pellets of the fusible material that are withdrawn through the removal means from the fluidized pellet bed, provide a substantially dust-free product consisting of substantially spherical pellets having a uniform, adherent coating of the finely divided solids of coating material.

In the practice of the process, the fluidizing gas is introduced into the bottom of the fluidized pellet bed, flows upward through this bed, leaves this bed at its upper free surface, enters the fluidized solids bed, flows upward through this bed, leaves this bed at its upper free surface, and exits from the apparatus near the top of the apparatus through a means provided for gas removal. Any solids that are entrained in the removed fluidizing gas may, if desired, be separated from the gas by a suitable means, such as a cyclone. The solids so separated may be re-employed in the process. Also the gas may be recirculated in the process by providing appropriate means, although it is necessary to increase the rate of flow by a suitable means and also to cool the gas.

Generally, an air distribution plate, which is a perforated plate or screen having the perforations spaced uniformly over the plate, is employed as a distributing means for the fluidizing gas and is located at or near the lower edge of the zone of fluidized pellets. If a distribution plate is not used to assure good fluidization, the fluidizing gas may be introduced into the apparatus and the lower edge of the zone of fluidized pellets through a plurality of openings in a conical gas plenum section of the apparatus. Preferably, a distributor plate is employed in the apparatus. Failure to employ a distributor plate results in reduced maximum production rates and, unless the gas introduction is carefully controlled, excessive amounts of pellets may be carried upward into the fluidized particle bed with subsequent deformation and agglomeration of the pellets and possibly plugging of the bed.

The fluidization gas for the process may be any gaseous substance which is inert toward the fusible material and the coating solids under the conditions, such as temperature and pressure, of the process. In most cases, air may be used. If, however, owing to the nature of the fusible material or the coating solids, the presence of oxygen is undesirable, a fluidizing gas which contains no free oxygen, such as carbon dioxide, or nitrogen, may be used instead of air.

By "finely divided coating solids" is meant solid substances, whose individual particles are regular or irregular in shape, have a maximum dimension no larger than the diameter of the molten droplets, and are solids under the process conditions. When the true density of such solid substances equals or is greater than the true density of the fusible material, the particle size should be considerably smaller than the size of the droplets to permit separation of loosely adhering coated particles and carrying upwards of such particles from the fluidized pellet bed. Preferably the particles are smaller than 70-mesh (U.S. Bur. Stds. Sieve Series), although somewhat larger particles of coating solids may be employed in some instances. The finely divided coating solids include inorganic and organic materials. The coating particles may comprise finely divided particles of the fusible material. Included among the suitable finely divided coating solids are clays, natural and synthetic resins, limestone, fertilizer materials, talc, diatomaceous earth, zein, calcium carbonate, and the like. The fluidized solids bed may, if desired, comprise particles of more than one of the suitable solids. The nature of the coating particles, their size, form, and surface conditions may affect the ease with which a bed of the same may be fluidized and, in some instances, may result in an unstable or agglomerating condition that makes fluidization difficult. Desirably, the particular bed of particles to be employed in the process is evaluated as to ease and suitable fluidization conditions in a small fluidization apparatus prior to practice of the process in an appropriate apparatus. In most cases, a range in the size of the coating solids facilitates fluidization. Extremely fine particles (i.e., less than 325 mesh) tend to be difficult to fluidize. Addition of particles, ranging from 325 mesh to about 65 mesh, to such fine particles frequently improves the ability to fluidize the extremely fine particles.

The fusible material should be fusible in nature, so that it may be liquefied by the application of heat and prepared in the form of droplets. Suitable fusible materials are liquid at elevated temperatures and solid at atmospheric temperatures. Included among the suitable fusible materials are rosin, ammonium nitrate, asphalt, synthetic hydrocarbon resins, natural and synthetic waxes, and many other fusible substances, which are well known and of obvious utility for the process of the invention.

Rosin is useful as an additive in glue, sizing, and soap compositions, ammonium nitrate in fertilizer compositions, asphalt in paving compositions, etc. For additive purposes, these materials desirably are in a divided state, such as pellets, rather than in a massive state. Thus, with pellets there exists no need to subdivide the fusible material before addition. Particularly desirable are such materials in the form of substantially spherical, coated pellets. Such pellets are aesthetically pleasing, easily handled, readily stored, and even after storage remain in a free-flowing condition. A rosin-clay product, such as disclosed in U.S. Patent 2,797,211, with a free-flowing condition even after storage, may be prepared by the present process.

The process of the invention may be carried out batchwise, intermittently, or continuously. Various apparatuses may be used. A preferred apparatus is illustrated in the attached drawings. For the sake of clearness and simplicity, many auxiliary items, such as vents, gauges, flowmeters, temperature controls, valves, supporting means, etc., have been illustrated by symbols or omitted from the drawings, as will be obvious to those skilled in the art.

In the drawings:

FIG. 1 is a diagrammatic vertical view of apparatus for carrying out the process of the invention; and FIG. 2 is a fragmentary cross-sectional view of the apparatus, illustrated in FIG. 1, and includes the excess particle-remover column and the pelletizing column enclosing the upper and lower fluidized beds.

Referring to FIGS. 1 and 2, the apparatus comprises a pelletizing column, generally designated 10, which includes an upper cylindrical section 11, a lower cylindrical section 12 of smaller diameter than upper section 11, and a tapered transitional section 13, which joins and blends lower section 11 into upper section 12. An auxiliary cooling jacket 14 surrounds sections 11, 12, and 13. A coolant, not illustrated, enters cooling jacket 14 through pipe 15, flows through the jacket 14 to assist in maintaining the temperatures in sections 11, 12, and 13, and exits through pipe 16. The upper end of column 10 is closed substantially by top plate 17.

A supply of fusible material 18 is introduced through pipe 19 into a feed tank 20 which is jacketed with a suitable means, such as heater means 21 for maintenance of material 18 in a molten state. Heater means 21, as illustrated in FIG. 2, comprises electrical resistance elements 21a. Material 18, when valve 22 is opened, flows downward from tank 20 into showerhead 23 and passes through a plurality of small orifices 24 in showerhead 23. Insulation 25 surrounds valve 22 and pipe 26 leading from tank 20 to showerhead 23. Top plate 17 abuts showerhead 23 in such a manner that orifices 24 open into the top of column 10. Material 20 issues from orifices 24 downwardly in the form of molten droplets 27 and/or discrete streams which break up into molten droplets 27 a short distance away from orifice 24.

An upper fluidized bed 28 of finely divided coating solids or particles 29 is maintained within the column 10 with the approximate upper free surface of the fluidized bed designated by dotted line 30. Droplets 27 fall freely downward through a substantially particle-free area for a short distance before passing through upper free surface 30. The amount of cooling and subsequent partial congealing of the droplets 27 as they fall for this short distance before entering surface 30, has an effect on the subsequently coated pellet and the amount of particle coating. Control of the amount of cooling is possible by varying this short free-fall distance of the droplets 27. This distance may be varied by raising or lowering of the showerhead 23 by a means not illustrated, or may be varied by changing the volume of the upper fluidized bed 28 by addition or removal of amounts of particles 29 with a subsequent raising or lowering of the location of upper free surface 30. Because of the relative size and density of droplets 27 in comparison to particles 29, the droplets proceed in a general downward direction through fluidized bed 28. Droplets 27 during passage through bed 28 obtain a coating of particles 29 thereon and congeal further to provide partially or substantially congealed, coated droplets 27'.

Coated droplets 27' after proceeding through bed 28 enter a lower fluidized bed 31 of coated pellets or droplets 27' and are assimilated into bed 31. Lower fluidized bed 31 merges into upper fluidized bed 28 at or near the connection of lower section 12 with tapered transitional section 13. The upper free surface of bed 31 in general coincides with the lower free surface of bed 28, with the approximate location of both of these surfaces designated by the dotted line 32. The lower free surface of lower bed 31 coincides in general with the upper surface of a gas distributor plate 33 located in the lower region of lower section 12.

A fluidizing gas, whose flow is indicated by solid arrows, after being brought to a suitable velocity by pump 34, proceeds through conduit 35 into a conical gas plenum section 36 which is joined to the lower edge of lower cylindrical section 12. The fluidizing gas flows through gas plenum section 36, upward through small holes or perforations 37 in gas distributor plate 33, through lower fluidized bed 31, through upper fluidized bed 28, and exits from column 10 through conduit 38 at the top of column 10. Fluidization of both lower and upper fluidized beds 31 and 28 is maintained by the upwardly flowing fluidizing gas that passes through both.

Removal of coated pellets 27' from bed 31 either periodically or continuously is brought about by a downward removal through valve 39 of coated pellets that collect in a stand-pipe 40. Stand-pipe 40 runs through the apex of conical gas plenum section 36 and through distributor plate 33 into fluidized bed 31. Substantial congealing and cooling of the coated droplets or pellets 27' occur in bed 31 and the coated pellets 27' removed from this bed are substantially free from loosely adhering coating particles and congealed sufficiently to be resistant to deformation from routine handling. From valve 39 the coated pellets 27' drop into an excess particle remover column 41. Alternatively, from valve 39 the coated pellets may be directed to a coated pellet receiver by a means not illustrated, if it is not desired to remove extremely small amounts of particles loosely adhering to the coated pellets.

Excess particle remover column 41 comprises a blower 42 for introducing a fluidizing gas through a conduit 43 which connects to a conical gas plenum section 44. Gas plenum section 44 connects to a cylindrical section 45 having a top plate 46 through which stand-pipe 40 passes. The fluidizing gas flows from conduit 43 through gas plenum section 44 and upwardly through small holes or perforations 47 in a gas distributor plate 48 which is located at or near the connection of section 44 to section 45. From the distributor plate 48, the gas flows upward with entrained traces of particles 29 and exits through conduit 49 near the top of section 45. Above distributor plate 48 the upwardly flowing fluidizing gas maintains a fluidized bed 50 of coated pellets 27'. The velocity of the fluidization gas generally is sufficient to provide a violet or turbulent fluidized bed of coated pellets 27'. The gas velocity is maintained below the settling velocity of the coated pellets 27' and above the settling velocity of the particles 29. Coated pellets dropping from standpipe 40 pass into this fluidized bed 50 of pellets and are rapidly assimilated into bed 50. The upper free surface of fluidized bed 50 is maintained below the level of conduit 49 by controlling the amount of coated pellets 27' removed from bed 50 and the flow of fluidizing gas. Removal of coated pellets 27' from bed 50 either periodically or continuously is brought about by a downward removal through valve 51 of pellets 27' that collect in a stand-pipe 52. Stand-pipe 52 runs through the apex of conical gas plenum section 44 through distributor plate 48 into fluidized bed 50. From stand-pipe 52, the coated pellets drop into a coated pellet receiver 53 of suitable size.

Fluidizing gases and any particles 29 entrained therein, leaving column 10 through conduit 38 and column 41 through conduit 49, are joined and pass through a common conduit 54 which connects to a particle collector means 55. Particle collectors, such as conventional cyclone separators, for separation of entrained solids from gases, may be employed, if desired, in place of the illustrated means 55. A reversed blower 56 connected to particle collector means 55 assists in the removal of the exiting gases from columns 10 and 41 and their transfer to means 55. Fluidizing gases exhausted by reverse blower 56 may, if desired, be cooled and recirculated through blowers 34 and/or 42 by means not illustrated. Particles 29 collected in means 55 fall into and accumulate in a lower conical portion 57 of means 55. The collected particles 29 upon opening of a valve 58 pass through conduit 59 to an elevator 60 for recirculation of particles to the upper fluidized bed 28 of column 10. A supply of coating particles 29 is provided in a container 61. By gravity feed, these particles 29 upon opening of a valve 62 pass through a conduit 63 to elevator 60. Elevator 60, by a mechanical means or other suitable means not illustrated, lifts particles 29 to an elevation higher than column 10 and permits sufficient particles 29 to replenish fluidized bed 28 to pass through a conduit 64 to enter column 10. The flows of fluidized particles 29 from container 61 and collector means 55 to column 10 are illustrated by broken-line arrows. The particles 29 entering column 10 are deflected and directed downward into the bed 28 by a baffle plate 65 extending downwardly from top plate to slightly below upper free surface 30. Alternatively the particles entering column 10 may be deflected and directed downward into the bed 28 by means of an extension (not illustrated) of conduit 64 that extends slightly below upper free surface 30.

The following specific examples were carried out with an apparatus, as illustrated in FIGS. 1 and 2. The tank holding the fusible material had a capacity of about 20 gallons. In the pelletizing column, the large diameter upper cylindrical section was 17 inches inside diameter by about 36 inches high and the small diameter lower cylindrical section was 7.6 inches inside diameter by about 12 inches high. The cylindrical section of the excess particle remover column was 5.9 inches inside diameter by about 72 inches high. The showerhead comprised a circular plate about 2½ inches in diameter by ¹⁄₁₆ inch thick with a total of 32 uniformly spaced orifices, each 0.026 inch in diameter. The gas distributor plate was about ¼ inch thick with a total of 48 uniformly spaced holes or perforations, each 0.25 inch in diameter.

*Example I*

Thirty pounds of finely divided clay having a mean average particle size of 18 microns and ranging in size from 5 to 80 microns were added to the pelletizing column. Air at atmospheric temperature was introduced into the gas plenum section to provide a linear air flow of 2.2 feet per second through the distribution plate, and molten rosin at a temperature of about 151° C. was permitted to pass through the showerhead orifices into the pelletizing column. Within a few seconds a sufficient amount of coated pellets reached the lower cylindrical section to provide a lower fluidized bed of coated pellets. At this time the air velocity in the upper bed of fluidized clay particles was 0.42 feet per second. A water coolant was employed in the cooling jacket to maintain the upper fluidized bed temperature between 140° to 145° F. Visual examination showed distinct upper and lower fluidized beds with the upper free surface of the upper fluidized clay bed about 20 inches below the showerhead orifices. As the amount of clay-coated rosin pellets built up in the lower fluidized bed, a portion of these pellets was withdrawn through the stand-pipe, so as to control the level of the upper free surface of the lower fluidized bed. The amount of the molten rosin introduced through the showerhead orifices was adjusted so that coated pellets remained in the lower fluidized bed about 6 minutes. As the surface of the fluidized clay bed dropped to a lower level in the column from diminution of clay, additional amounts of clay were supplied to the upper bed to raise the upper free surface to its position about 20 inches below the showerhead orifices.

The pelletized product that was withdrawn from the stand-pipe extending to the lower fluidized bed consisted essentially of substantially spherical, clay-coated, rosin pellets. The clay content of the pellets averaged 9 percent by weight with an average loose clay content of less than 1 percent by weight. Over 90 percent by weight of the pellets was from minus 8 to plus 30 mesh (U.S. Bur. Stds. Sieve Series). An average of 35 pounds per hour of coated pellets was obtained over a three-hour period.

By passing the pelletized product that was withdrawn from the stand-pipe extending into the lower fluidized bed through the excess particle remover column of the apparatus, a superior dust-free product was obtained. Air at atmospheric temperature with a velocity of 3.9 feet per second was admitted into the glas plenum section of the excess particle remover column. Within a few seconds a sufficient amount of pellets reached this column to provide a turbulent fluidized bed of coated pellets whose upper surface was lower than the conduit for the exiting air. Pellets were admitted and withdrawn to this fluidized bed through the respective stand-pipes at a rate to maintain this upper surface below the level of the conduit for the exiting air. Retention time for the coated pellets in this turbulent fluidized bed was about 6 minutes. The pelletized product from the excess particle remover column was substantially dust-free, with the rosin pellets uniformly coated with clay particles.

*Example II*

Additional process runs were made with rosin as the fusible material and clay particles as the coating particles at substantially the same conditions as in Example I except that the introduced amounts of molten rosin were varied. When the ratio by weight of molten rosin droplets to fluidized clay particles in the upper fluidized bed was about 1:0.3, the process was inoperable due to agglomeration of droplets into clusters. When the rosin-to-clay ratio was less than 1:1, poor results were obtained, in that occasional agglomeration occured. At lower rosin-in-to-clay ratios, in particular ratios of 1:2 up to 1:20, very satisfactory results were obtained of substantially spherical, uniformly clay-coated rosin pellets were obtained. Optimum results were obtained at a 1:5 ratio in that the process proceeded readily with little or no difficulty.

*Example III*

Additional process runs were made with rosin as the fusible material and clay particles as the coating particles at substantially the same conditions as Example I, except that the coolant flow was regulated to vary the upper fluidized bed temperature. By varying the maintained fluidized bed temperature from 20° to 120° C., it was possible to increase the amount of clay coating on the rosin pellets from as low as about 2 percent to as high as about 80 percent by weight in some runs at the high temperatures.

*Example IV*

An additional process run was made under substantially the same conditions as those of Example I with finely divided zein as the coating particles. The zein particles were of a size capable of passage through a 150-mesh sieve (U.S. Bur. Stds. Sieve Series). The obtained pelletized product consisted of substantially spherical, zein-coated, rosin pellets ranging in size from ¹⁄₁₆ to ³⁄₁₆ inch in diameter with a mean average diameter of ⅛ inch. The zein content of the pellets average about 20 percent by weight with an average loose zein content of less than 0.5 percent by weight after passage through the excess particle remover column.

*Example V*

Molten ammonium nitrate at a temperature of about 175° C. in place of molten rosin in a process under substantially the same conditions as those of Example I provided a pelletized product consisting of clay-coated, ammonium nitrate pellets. The product consisted of substantially spherical pellets ranging in size from 1/32 inch to 3/32 inch in diameter with a mean average diameter of 1/16 inch. The clay content of the pellets averaged about 2 percent by weight with a loose clay content of less than 0.5 percent by weight after passage through the excess particle remover column.

Various changes and modifications of the invention will be obvious to those skilled in the art. It is desired to include all such changes and modifications that fall within the true spirit and scope of the invention and to limit the invention only as set forth in the appended claims.

What is claimed is:

1. A process for preparing substantially spherical coated droplets of a fusible material having a coating of discrete solid particles of finely divided coating solids adhering thereto, the process comprising: flowing a stream of a fluidizing gas upwardly through a first fluidized bed, from the first fluidized bed upwardly through a second fluidized bed, and from an upper free surface of the second fluidized bed upwardly through a space, the first fluidized bed of coated droplets, the second fluidized bed of finely divided coating solids with the second fluidized bed at a temperature higher than the temperature of the first fluidized bed and lower than the liquefaction temperature of the finely divided coating solids, the space substantially lacking finely divided coating solids, the first fluidized bed having a cross-sectional area smaller than the cross-sectional area of the second fluidized bed with the first and second fluidized beds free from physical means for separating the first and second fluidized beds; introducing molten droplets of the fusible material into said space, the molten droplets larger than the finely divided coated solids and at a temperature higher than the temperature of the flowing stream of the fluidizing gas, the fusible material characterized as a liquid at elevated temperatures and a solid at atmospheric temperatures; passing the molten droplets downward through said space, through said upper free surface, through the second fluidized bed, and as coated droplets into the first fluidized bed; and withdrawing coated droplets from the first fluidized bed.

2. A process for preparing a product consisting essentially of substantially spherical, solid pellets of a fusible material, characterized as a liquid at elevated temperatures and a solid at atmospheric temperatures, with a uniform, adherent coating of discrete solid particles of finely divided solids, the process comprising: producing molten droplets of the fusible material, the molten droplets larger than the finely divided solids; introducing a fluidizing gas at a temperature lower than the temperature of the molten droplets upwards into and through a fluidized bed of coated pellets to maintain said bed of said coated pellets in a fluidized condition; passing the fluidizing gas from said bed of said coated pellets upwards into and through a fluidized bed of finely divided solids to maintain said bed of said solids in a fluidized condition and at a temperature lower than the liquefaction temperature of said solids with said bed of said coated pellets and said bed of said solids free from a physical means therebetween for separating said bed of said coated pellets and said bed of said solids; introducing the molten droplets downwards through an upper free surface of said bed of said solids into and through said bed of said solids to coat the molten droplets with a coating of the finely divided solids; passing the coated droplets downwards into said bed of said coated pellets to cool said coated droplets and to remove coating solids adhering loosely to said coated droplets to provide coated pellets assimilated into said fluidized bed of said coated pellets; and withdrawing coated pellets from said fluidized bed of said pellets.

3. The process of claim 2 in which the fusible material is ammonium nitrate.

4. The process of claim 2 in which the fusible material is rosin.

5. The process of claim 2 in which the fusible material is rosin and the finely divided solids are clay particles capable of passage through a U.S. No. 70 sieve.

6. A process for preparing substantially spherical, solid rosin pellets with a uniform, adherent coating of discrete solid particles of finely divided clay, the process comprising: producing molten droplets of rosin having a temperature higher than the melting point of the rosin; introducing the molten droplets in the top of a pelletizing column for downward passage through the column, the column comprising an upper region and a lower region having a cross-sectional area smaller than the cross-sectional area of the upper region with the lower and the upper regions free from a physical means therebetween for separating said regions; introducing air at atmospheric temperatures into the lower region of the pelletizing column for upward flow through the column; introducing a finely divided clay of particles smaller than the molten droplets and capable of passage through a U.S. No. 70 mesh sieve into the upper region of the column, the upwardly flowing air in the upper region of the column maintaining therein a fluidized bed of the finely divided clay; maintaining the fluidized bed of said clay at a temperature between 20° to 120° C.; coating the molten droplets with particles of the finely divided clay during downward passage through the fluidized bed of said clay with the amounts of introduced molten droplets of rosin to finely divided clay maintained within a 1:2 to 1:20 ratio within said bed of said clay; collecting the coated droplets in the lower region of the column with the upwardly flowing air in the lower region of the column maintaining therein a fluidized bed of the coated droplets; withdrawing portions of the coated droplets from the fluidized bed of said coated droplets, the withdrawn portions of the coated droplets consisting essentially of the substantially spherical, solid rosin pellets with a uniform, adherent coating of discrete solid particles of the finely divided clay.

7. In an apparatus for pelletizing, coating, and cooling of molten droplets of a fusible material, characterized as a liquid at elevated temperatures and a solid at atmospheric temperatures, the combination comprising: an upper section for enclosing a fluidized bed of finely divided coating solids; a means adjacent the upper section for maintaining the temperature of the fluidized bed of said coating solids; a lower section for enclosing a fluidized bed of coated pellets, the lower section enclosing a cross-sectional area smaller than the cross-sectional area enclosed by the upper section; a means for joining the upper section and the lower section, the upper section communicating with the lower section with the upper and lower sections free from physical means for separating said fluidized bed of finely divided coating material enclosed in the upper section and said fluidized bed of coated pellets enclosed in the lower section; a means for melting the fusible material, breaking the melted fusible material into molten droplets, and introducing the molten droplets in an enclosed upper region of the upper section for downward passage of the molten droplets through the enclosed fluidized bed of said coating solids into the enclosed fluidized bed of said pellets; a means for introduction of a fluidizing gas at atmospheric temperatures into said fluidized bed of said pellets and for passage of the gas upwards through the fluidized bed of said pellets and the fluidized bed of said coating solids for maintaining the fluidized beds in a fluidized condition; and a means for withdrawal of coated pellets from said fluidized bed of said pellets.

8. The apparatus of claim 7 in which the means for joining the upper section and the lower section includes a tapered transitional section.

References Cited in the file of this patent

UNITED STATES PATENTS

| | | |
|---|---|---|
| 857,756 | Reddy | June 25, 1907 |
| 1,627,863 | O'Neil | May 10, 1927 |
| 1,782,038 | Haak | Nov. 18, 1930 |
| 2,059,983 | Dent et al. | Nov. 3, 1936 |
| 2,186,659 | Vogt | Jan. 9, 1940 |
| 2,399,987 | Cordie et al. | May 7, 1946 |
| 2,484,792 | Mollring | Oct. 11, 1949 |
| 2,644,769 | Robinson | July 7, 1953 |
| 2,768,095 | Tadema et al. | Oct. 23, 1956 |
| 2,844,489 | Gemmer | July 22, 1958 |
| 2,865,868 | McKinley et al. | Dec. 23, 1958 |

OTHER REFERENCES

Othmer: Fluidization, Reinhold Publishing Corp., New York, 1956, pages 220 to 223.